Patented July 18, 1944

2,353,910

UNITED STATES PATENT OFFICE

2,353,910

COATING COMPOSITION

William P. Lawler, George J. Hable, and John Vernon Steinle, Racine, Wis., assignors to S. C. Johnson & Son, Inc., Racine, Wis., a corporation of Wisconsin No Drawing. Application February 18 1942, Serial No. 431,338

17 Claims. (Cl. 260—22)

This invention relates to coating compositions and, more particularly, to compositions having two or more film forming resins in solution in a common solvent or combination of solvents.

Paint enamels having a drying oil modified alkyd resin as the major resinous components have heretofore been employed as protective coatings on interior woodwork, furniture, desks, cabinets, office equipment, refrigerators, automobiles, etc. Upon drying these present day enamels become quite hard and brittle and are therefore readily marred or scarred. Enameled furniture and other articles are frequently polished with a hard wax to impart the desirable soft lustre thereto which is characteristic of wax, and also to increase its resistance to moisture.

This invention has therefore as the principal object the provision of compositions which produce mar-resistant films. A further object is the provision of compositions which produce a more plastic film having a satin-like gloss. It is still a further object to provide protective coatings as above which, upon drying, have a wax-like material colloidally and molecularly dispersed within and on the surface thereof whereby water and dirt resistant properties are imparted to the paint film. Other objects will appear as the description of the invention proceeds.

These and other objects are accomplished in the present invention by the incorporation into a drying oil-modified alkyd resin enamel of a small percentage of a polyvinyl ether of a long chain aliphatic alcohol.

It is well known in the art that the alkyd resins are the reaction products of polyhydric alcohols and polybasic acids. Suitable polybasic acids, for example, are phthalic, maleic, succinic, fumaric, adipic, sebacic, citric, malic tartaric, diphenic and naphthalic. Polyhydric alcohols which have been employed in manufacturing an alkyd resin are glycerol, pentaerythritol, sorbitol, mannitol, ethylene glycol and diethylene glycol.

Alkyd resins which contain as a part of their composition, unsaturated materials, such as the oxidizable acids of a drying oil, are converted to an insoluble and infusible stage by combination with an element such as oxygen. The oxidizable acids in general are the unsaturated fatty acids and the method of incorporating these acids into an alkyd resin as the esters of the polyvalent alcohol employed in its manufacture, are known in the paint manufacturing art. Unsaturated fatty acids suitable for modifying alkyd resins and which are readily available are ricinoleic, oleic, linoleic, linolenic, erusic, clupanadonic, octadecadienic, alpha elaeostearic, and beta elaeostearic. In practice these acids are incorporated into the resin by using a mixture of the glycerides of these acids which are available in drying and semi-drying oils such as, for example, linseed, perilla, sunflower, soy, rapeseed, hempseed, sardine, cottonseed, dehydrated castor, tung, walnut, and oiticica. The glyceride component of the oil forms a part of the polyvalent alcohol required in manufacturing the alkyd resin.

The objects of the present invention are accomplished by manufacturing a paint enamel having a drying-oil-modified alkyd resin as the major resinous component and incorporating therein a relatively small proportion of a polyvinyl alkyl ether. The wax-like polyvinyl ether resins suitable for this purpose are those of vinyl alcohol with long-chain aliphatic alcohols, especially those corresponding to the saturated or unsaturated fatty acids containing up to about 35 carbon atoms, as for example those corresponding to the acids of fats and waxes of animal and vegetable origin, such as decyl, dodecyl, tetradecyl, cetyl, docosanyl, octodecyl, or octodecenyl alcohols or the vinyl ethers of "montanol," the mixture of alcohols corresponding to the mixture of acids of montan wax. The polyvinyl alkyl ether may be prepared according to U. S. Patent Numbers 2,104,000, 2,104,001, and 2,104,002. The preferred resin, which has the physical characteristics of wax, may be prepared in accordance with Example 10 of U. S. Patent 2,104,000 employing the alcohols corresponding to the acids of montan wax and polymerizing until the reaction product possesses about the following physical and chemical characteristics:

| | |
|---|---|
| Melting point _____°F___ | 122–125 |
| Acid value _____ | 0 |
| Ester value _____ | 0–10 |
| Unsaponifiable matter _____percent___ | 100 |
| Saponification value _____ | 0–10 |
| Specific gravity (68° F.) _____ | .93–.94 |

Solubility—very high in turpentine and turpentine substitutes.

In preparing a coating composition, the above described polyvinyl alkyl ether and the modified alkyd resin are dissolved in a volatile organic solvent. Any volatile organic solvent or combination of solvents capable of dissolving the modified alkyd resin is suitable for this purpose as for example liquid hydrocarbons, halogenated hydrocarbons, esters, ketones, carbon tetrachloride, turpentine, or mixtures thereof.

The alkyd resin is modified with the drying oil or oxidizable fatty acid to at least 25% and not exceeding about 90% of the total weight of the resin. In manufacturing a paint enamel, the ordinary paint pigments and paint driers are added. It has been found that a concentration of the polyvinyl alkyl ether of from about .1 of one to about 13% by weight of the modified alkyd resin will provide an enamel which will dry to a desirable gloss having a polished wax-like sheen. This is believed to be caused by the solid solution of the vinyl resin in the alkyd resin whereby the former remains molecularly and colloidally dispersed within and on the surface of the alkyd resin film thereby preventing a crystallization of the solute into particles of sufficient size to disperse light waves. Concentrations of polyvinyl alkyl ethers of from about 13 to 25% by weight of the modified alkyd resin may be used when a dull finish is desired. The preferred concentration of vinyl resin, however, is about 2% of the alkyd resin.

Fused fossil resins, ester gums, and phenolic-aldehyde condensation resins may be employed to substitute in part for the modified alkyd resin provided such substitution does not exceed about 50 per cent.

The following examples will further illustrate the nature of this invention, but the invention is not restricted to these examples. The parts are by weight.

Example I—General formula

| | |
|---|---|
| Paint enamel vehicle wherein at least 50% of the film forming resins consist of alkyd resins which have been modified about from 25 to 90% with an oxidizable unsaturated fatty acid | 25 to 95 |
| Polyvinyl ether of a long chain aliphatic alcohol having from 10 to 35 carbon atoms in an amount from about .1 of one to 25% of the modified alkyd resin | |
| Pigments | 5 to 75 |

Example II

| | |
|---|---|
| Glycerol phthalate resin modified 50% with linseed oil | 240 |
| Pigments | 357 |
| Metallic driers | 4 |
| Polyvinyl montanol ether | 12 |
| Petroleum naphtha | 386 |

Example III

| | |
|---|---|
| Glycerol phthalate resin modified 50% with linseed oil | 240 |
| Pigments | 357 |
| Metallic driers | 4 |
| Polyvinyl octodecyl ether | 12 |
| Turpentine | 386 |

Example IV

| | |
|---|---|
| Glycerol phthalate resin modified 40% with oxidizable unsaturated fatty acids having from 13 to 22 carbon atoms | 240 |
| Pigments | 357 |
| Driers | 4 |
| Polyvinyl ether of alcohols corresponding to the acids of carnauba wax | 12 |
| Acetone | 386 |

Example V

| | |
|---|---|
| Sorbitol maleic resin modified 50% with soy oil | 240 |
| Pigments | 357 |
| Driers | 4 |
| Ethyl acetate | 386 |
| Polyvinyl ether of an aliphatic alcohol having from 10 to 35 carbon atoms | 12 |

Example VI

| | |
|---|---|
| Glycerol phthalate resin modified 40% with perilla oil | 200 |
| Ether gum | 40 |
| Polyvinyl ether of the alcohols corresponding to the acids of montan wax | 12 |
| Driers | 4 |
| Pigments | 357 |
| Petroleum naphtha | 386 |

Example VII

| | |
|---|---|
| Glycerol phthalate resin modified 50% with tung oil | 200 |
| Fused copal resin | 40 |
| Polyvinyl ether of the alcohols corresponding to the acids of montan wax | 12 |
| Driers | 4 |
| Pigments | 357 |
| Volatile coal tar hydrocarbon | 386 |

The mixing process is as follows: The metal oxides or pigments are ground to the required fineness simultaneously with the resin which has been modified with a drying oil during its manufacture and thinned with a volatile organic solvent to the proper viscosity for grinding. This constitutes standard practice in the preparation of a vehicle for an enamel. The polyvinyl alkyl ether is dissolved in the organic solvent which is then added to the vehicle with enough additional thinner to give the product a viscosity constituent with the requirements of ordinary painting conditions. The procedure may be varied by grinding simultaneously the pigments and all the resins and then adding the thinner.

A paint enamel prepared in accordance with this invention, when applied to a surface and allowed to dry, provides a paint enamel film which is more mar proof, more water and dirt resistant, and which lends itself more readily to the removal of scuffs and mars than ordinary present day enamels. In addition, this novel composition provides a film having a wax-like texture and, when the concentration of the vinyl resin is less than about 13% of the alkyd resin, said film dries to a characteristic satin gloss.

As many apparently widely different embodiments of this invention may be made without departing from the spirit thereof, it is to be understood that no limitation to the foregoing examples is intended, except as indicated in the appended claims.

This application is a continuation in part of application having Serial Number 259,790, which was filed on March 4, 1939.

We claim:

1. A coating composition comprising a resin resulting from the polymerization of a vinyl ether of an alcohol having from about 10 to 35 carbon atoms, an alkyd resin which has been modified about from 25% to 90% with an oxidizable unsaturated fatty acid and a volatile organic solvent for the modified alkyd resin, the ingredients being present in the proportion by weight of about from .1 of one to 13 parts of the said polyvinyl resin to 100 parts of the said modified alkyd resin, whereby, upon evaporation of the solvent, a flexible, moistureproof, homogeneous, strong, tough and firmly adherent coating or film is produced.

2. A coating composition comprising a resin resulting from the polymerization of a vinyl ether of an alcohol having from about 10 to 35 carbon atoms, an alkyd resin which has been modified about from 25% to 90% with an oxidizable unsaturated fatty acid, a resin selected from the group consisting of fused fossil gum and ester gums, and a volatile organic solvent for the said modified alkyd resin, the ingredients being in the proportion by weight of about from .1 of one to 13 parts of said polyvinyl ether resin to 100 parts of the combined remaining resins wherein the modified alkyd resin is present in excess of fifty percent.

3. A coating composition comprising a resin resulting from the polymerization of the vinyl ethers of the mixture of alcohols corresponding in the number of carbon atoms to the acids of montan wax, a glycerol phthalate resin which has been modified about from 25% to 90% with an oxidizable unsaturated fatty acid, and a volatile organic solvent for the alkyd resin, the ingredients being present in the proportions by weight of about from .1 of one to 13 parts of the said polyvinyl alkyl ether resin to 100 parts of the said modified glycerol phthalate resin, whereby, upon evaporation of the solvent, a flexible, moistureproof, homogeneous, strong, tough and firmly adherent coating or film is produced.

4. A composition as set forth in claim 1 which also contains paint pigments and paint driers.

5. A composition as set forth in claim 2 which also contains paint pigments and paint driers.

6. A composition as set forth in claim 3 which also contains paint pigments and paint driers.

7. A coating composition for producing a paint enamel film having a wax-like lustre comprising paint pigments, paint driers, petroleum naphtha, glycerol-phthalate resin which has been modified about from 25 to 90% with a drying vegetable oil, and the resin formed by the polymerization of the vinyl ethers of the mixture of alcohols corresponding to the acids of montan wax in an amount equal to about 5% by weight of the said modified glycerol-phthalate resin.

8. A coating composition for providing a decorative paint enamel film characterized in having a wax-like sheen and texture which comprises an alkyd resin that has been modified about from 25 to 90% with an oxidizable unsaturated fatty acid, a polymerized vinyl ether of octodecyl alcohol, and a volatile organic solvent for the alkyd resin, the ingredients being in about the proportions by weight of from .1 of one to 13 parts of the said polymerized vinyl octodecyl ether to 100 parts of the said modified alkyd resin.

9. A paint enamel coating composition comprising paint pigments and driers dispersed in a paint vehicle comprising a resin resulting from the polymerization of a vinyl ether of an alcohol having from about 10 to 35 carbon atoms, an alkyd resin which has been modified from about 25% to 90% with a drying vegetable oil, and a volatile organic solvent for the modified alkyd resin, the ingredients in the vehicle being present in the proportion by weight of about from .1 of one to 13 parts of the said polymerized vinyl resins to 100 parts of the said modified alkyd resin.

10. A coating composition for producing a paint enamel film having a wax-like lustre comprising paint pigments, an alkyd resin which has been modified about from 25% to 90% with an oxidizable unsaturated fatty acid, a resin resulting from the polymerization of a vinyl ether of an alcohol having from 10 to 35 carbon atoms in an amount from .1 of one % to 13% by weight of the modified alkyd resin, and a petroleum hydrocarbon solvent.

11. A paint enamel coating composition comprising paint pigments and driers dispersed in a vehicle comprising a petroleum hydrocarbon solvent, a glycerol phthalate resin which has been modified about from 25 to 90% with an oxidizable unsaturated fatty acid, and a polyvinyl ether of an alcohol having about from 10 to 35 carbon atoms in an amount from .1 of one to 13% by weight of the modified glycerol phthalate resin.

12. A paint enamel coating composition comprising paint pigments and driers dispersed in a vehicle comprising a petroleum hydrocarbon solvent, an alkyd resin which has been modified about from 25 to 90% with an oxidizable unsaturated fatty acid, and a resin resulting from the polymerization of the vinyl ethers of the mixture of alcohols corresponding in the number of carbon atoms to the acids of montan wax in an amount of .1 of one to 13% by weight of the modified alkyd resin.

13. A paint enamel coating composition comprising paint pigments and driers dispersed in a vehicle comprising a petroleum hydrocarbon solvent, a glycerol phthalate resin which has been modified about from 25 to 90% with an oxidizable unsaturated fatty acid, and a resin resulting from the polymerization of the vinyl ethers of the mixture of alcohols corresponding in the number of carbon atoms to the acids of montan wax in an amount from .1 of one to 13% by weight of the modified glycerol phthalate resin.

14. A paint enamel coating composition comprising paint pigments and driers dispersed in a vehicle comprising turpentine, a glycerol phthalate resin which has been modified about from 25 to 90% with an oxidizable unsaturated fatty acid, and a polyvinyl ether of an alcohol having about from 10 to 35 carbon atoms in an amount from .1 of one to 13% by weight of the modified glycerol phthalate resin.

15. A paint enamel coating composition comprising paint pigments and driers dispersed in a vehicle comprising turpentine, an alkyd resin which has been modified about from 25 to 90% with an oxidizable unsaturated fatty acid, and a resin resulting from the polymerization of the vinyl ethers of the mixture of alcohols corresponding in the number of carbon atoms to the acids of montan wax in an amount of .1 of one to 13% by weight of the modified alkyd resin.

16. A paint enamel coating composition comprising paint pigments and driers dispersed in a vehicle comprising turpentine, a glycerol phthalate resin which has been modified about from 25 to 90% with an oxidizable unsaturated fatty acid, and a resin resulting from the polymerization of the vinyl ethers of the mixture of alcohols corresponding in the number of carbon atoms to the acids of montan wax in an amount from .1 of one to 13% by weight of the modified glycerol phthalate resin.

17. A paint enamel coating composition comprising paint pigments and driers dispersed in a vehicle comprising turpentine, an alkyd resin which has been modified about from 25 to 90% with an oxidizable unsaturated fatty acid, and a polyvinyl ether of an alcohol having about from 10 to 35 carbon atoms in an amount from .1 of one to 13% by weight of the modified alkyd resin.

WILLIAM P. LAWLER.
GEORGE J. HABLE.
JOHN VERNON STEINLE.

CERTIFICATE OF CORRECTION.

Patent No. 2,353,910.　　　　　　　　　　　　　　July 18, 1944.

WILLIAM P. LAWLER, ET AL.

It is hereby certified that error appears in the printed specification of the above numbered patent requiring correction as follows: Page 2, second column, line 31, for the word "constituent" read --consistent--; and that the said Letters Patent should be read with this correction therein that the same may conform to the record of the case in the Patent Office.

Signed and sealed this 26th day of September, A. D. 1944.

Leslie Frazer (Seal)　　　　　　　　　　　　　Acting Commissioner of Patents.